United States Patent
Keereman et al.

(10) Patent No.: US 12,465,053 B2
(45) Date of Patent: Nov. 11, 2025

(54) HYDRAULIC CONTROL FOR A FOOD BAKING APPARATUS

(71) Applicant: INCOMEC-CEREX NV, Brakel (BE)

(72) Inventors: Filip Keereman, Zwalm (BE); Emmanuel Petre, Ghent (BE); Johan Van De Vijver, Zottegem (BE)

(73) Assignee: INCOMEC-CEREX NV, Brakel (BE)

(*) Notice: Subject to any disclaimer, the term of this patent is extended or adjusted under 35 U.S.C. 154(b) by 695 days.

(21) Appl. No.: 17/766,026

(22) PCT Filed: Oct. 12, 2020

(86) PCT No.: PCT/EP2020/078621
§ 371 (c)(1),
(2) Date: Apr. 1, 2022

(87) PCT Pub. No.: WO2021/069741
PCT Pub. Date: Apr. 15, 2021

(65) Prior Publication Data
US 2022/0338485 A1    Oct. 27, 2022

(30) Foreign Application Priority Data

Oct. 11, 2019   (BE) .................................. 2019/5686

(51) Int. Cl.
*A21B 5/00* (2006.01)
*A21B 1/42* (2006.01)
*A23P 30/10* (2016.01)

(52) U.S. Cl.
CPC .................. *A21B 5/00* (2013.01); *A21B 1/42* (2013.01); *A23P 30/10* (2016.08)

(58) Field of Classification Search
None
See application file for complete search history.

(56) References Cited

U.S. PATENT DOCUMENTS 4,281,593 A * 8/1981 Gevaert .................. A23L 7/178
                                                 99/323.4
5,102,677 A * 4/1992 Van Den Berghe .... A23L 7/178
                                                 426/523
(Continued)

FOREIGN PATENT DOCUMENTS

GB        2399274 A *  9/2004   .......... A23L 1/0073
JP      H09140369 A    6/1997
(Continued)

OTHER PUBLICATIONS

International Search Report and Written Opinion dated Nov. 27, 2020, pertaining to Int'l Patent Application No. PCT/EP2020/078621.

(Continued)

*Primary Examiner* — Thor S Campbell
(74) *Attorney, Agent, or Firm* — DINSMORE & SHOHL LLP (57) ABSTRACT

The invention relates to hydraulic control for carrying out a method of producing a cracker from cereals, which are pressure-baked in a heated mold and expanded afterwards. In particular the hydraulic control system, comprising of a plurality of hydraulic cylinders, will lead to an increased expansion speed or an increased speed for opening the dies, resulting in constant high-quality food products.

4 Claims, 5 Drawing Sheets

(56) References Cited

U.S. PATENT DOCUMENTS

| | | | | |
|---|---|---|---|---|
| 5,467,693 A * | 11/1995 | Van den Berghe | .... | A21C 11/00 99/349 |
| 5,755,152 A * | 5/1998 | Menzin | .......... | A23L 7/178 426/445 |
| 5,881,634 A * | 3/1999 | Newton | .......... | A47J 37/0611 99/372 |
| 7,918,157 B2 * | 4/2011 | Van Den Berghe | .... | A23P 30/36 99/372 |
| 9,924,738 B2 * | 3/2018 | Graham | .......... | A23P 30/36 |
| 11,166,469 B1 * | 11/2021 | Emery | .......... | A21B 5/02 |
| 11,191,294 B1 * | 12/2021 | Van Poucke | .......... | A21B 5/00 |
| 11,589,606 B1 * | 2/2023 | Van Poucke | .......... | A23P 30/32 |
| 11,772,348 B2 * | 10/2023 | Van de Vijver | .......... | A21B 1/42 192/116.5 |
| 2005/0150392 A1 * | 7/2005 | Van Poucke | .......... | A23P 30/30 99/323.4 |
| 2007/0160733 A1 * | 7/2007 | Van Den Berghe | .... | A23P 30/36 426/549 |
| 2011/0056368 A1 * | 3/2011 | McBride | .......... | F15B 1/024 91/165 |
| 2012/0011722 A1 * | 1/2012 | Briese | .......... | B21D 53/74 29/897.3 |
| 2013/0312599 A1 * | 11/2013 | Cover | .......... | F16J 1/12 92/169.1 |
| 2024/0180169 A1 * | 6/2024 | Sorokin | .......... | A21B 1/42 |

FOREIGN PATENT DOCUMENTS

| | | |
|---|---|---|
| KR | 20060121083 A | 11/2006 |
| WO | 2021069741 A1 | 4/2021 |

OTHER PUBLICATIONS

Anonymous, "Engineering Essentials: Cylinders Hydraulics & Pneumatics", pp. 1-24, Jan. 1, 2012, XP055691605.

Anonymous, "Sensor Choices for Pneumatic Cylinder Positioning Hydraulics & Pneumatics", pp. 1-16, Jun. 30, 2016, XP055691606.

International Preliminary Report on Patentability dated Oct. 11, 2019, pertaining to Int'l Patent Application No. PCT/EP2020/078621.

* cited by examiner

Figure 5

HYDRAULIC CONTROL FOR A FOOD BAKING APPARATUS

CROSS REFERENCES TO RELATED APPLICATIONS

This application is a national-stage application under 35 U.S.C. § 371 of International Application No. PCT/EP2020/078621, filed Oct. 12, 2020, which International Application claims benefit of priority to Belgian Patent Application No. BE2019/5686, filed Oct. 11, 2019.

TECHNICAL FIELD

The invention relates to a system and method for improved control over the production of food products from granular raw materials such as cereal rice, corn or the like and mixtures thereof, or from starchy materials like grains or pellets or a mixture thereof, optionally mixed with crushed grain material, or with other inclusions of less starchy nature, which are formed into crackers, chips or shaped end-products in general. More in particular the invention relates to hydraulic control for carrying out a method of producing a cracker from cereals, which are pressure-baked in a heated mold and expanded afterwards.

BACKGROUND OF THE INVENTION

Systems and apparatuses are currently on the market to form starchy materials into finished crackers, chips, cakes or the like forms. As for example described in U.S. Pat. Nos. 5,102,677 and 5,467,693, methods exist for producing a cracker from cereals, which are pressure-baked in a heated mold and expanded afterwards, wherein such mold being defined by a fixed upper mold, a movable lower mold, also referred to as punch, and there between a peripheral or so-called ring mold element which is individually movable. Driving means are provided for actuating the movable punch, which are in the form of two aligned, separately controlled hydraulic cylinders of which one cylinder defines a precise expansion and the other cylinder controls the compression in combination with separate end switch means.

For current systems consisting of a fixed upper die, a movable ring die and a movable lower die as mentioned above, the movable ring die is for example air-driven, whereas the movable lower die can be hydraulically driven via a pressure transducing system. The driving means for the lower die, comprising of two back-to-back mounted hydraulic cylinders being positioned almost horizontally, are thus moving the lower die by means of a pressure transducer, in vertical direction. Both upper and lower dies comprise of a heated mounting plate and die stems that are fixed on the mounting plate.

The starchy materials are volumetrically dosed on the lower die and are then, by the upward vertical movement of the lower die crushed against the fixed upper die and heated in between upper and lower dies. The ring die is simultaneously positioned around both upper and lower die stems to avoid that the material that plasticizes under heat and pressure can escape out of the narrow gap thus created.

Referring further to the driving means, one can say that the first or front hydraulic cylinder is creating the expansion room to allow the material to expand, whereas the second or back one is merely used to position the lower die in the different positions needed for dosing in the materials, removing the finished product etc. The first or front hydraulic cylinder herewith mentioned, is defined as the cylinder being closest to drive shaft and transmission member connected with the punch. The first or front hydraulic cylinder creates the expansion room by moving inwards from a determined position, as controlled by a position sensor, till the end of its stroke, thus mechanically stopping this inward movement. This leads to very repetitive behavior of the machine and thus a very accurate thickness of the cracker end products, this end thickness can be adjusted by moving the position sensor.

A food baking apparatus with hydraulic driving means is often preferred when compared to an air-driven machine because it is much more energy efficient. Moreover, a hydraulically driven food baking apparatus has a much more repetitive machine behavior, leading to a better and constant high quality of baked food product in size, shape, thickness and texture. Further, a hydraulically driven food baking apparatus can produce more end-products on the same footprint than air-driven machines because of the much higher crushing power created with the hydraulic driving system in combination with the pressure transducing system.

The food baking apparatus with above described hydraulic driving system, although having many advantages over air-driven machines (or other hydraulically driven machines than mentioned above), shows also some disadvantages that need to be tackled. By means of example, mentioned hydraulically driven food baking apparatus in the art has a slower speed for opening the dies than an air-driven machine because of the nature of the used form of energy, i.e. compressed air versus hydraulic fluids, and the responsiveness of air cylinders versus hydraulic cylinders. In addition, this slower speed for opening the dies is caused by the position of the driving means, being vertically positioned straight under the die in case of an air-driven machine as compared to being mounted almost horizontally and via a pressure transducer vertically driving the punch in case of mentioned food baking apparatus with hydraulic cylinders from the art.

Furthermore, the slower speed is caused by the heavier weight of the dies, being larger than for standard air-driven machinery, and thus allowing for higher numbers of cakes produced on one single die. For instance 6 pieces or crackers can be produced on mentioned food baking apparatus from the art versus only one piece on the air-driven machine. Subsequently, the weight of the complete die (comprising lower, upper and peripheral die) on a hydraulically driven food baking apparatus as described, is much higher than on an air-driven machine and hence the speed for opening such die being much lower.

The combination of all of the above-mentioned factors explain the important difference in opening speed between mentioned hydraulically driven food baking apparatus and an air-driven machine. The drawback of such slower die opening speed is now further discussed.

The speed of opening of the dies has an important influence on the baked food product. Particularly when trying to achieve a maximum thickness of finished food products, e.g. very airy and crunchy crackers, this opening speed is a decisive factor. Whereas the cake thickness on mentioned hydraulically driven food baking apparatus from the art is usually limited to 12-13 mm, thicknesses of 15-16 mm or even higher can be achieved with air-driven machines. An explanation for this difference can be found in the following. Upon initial opening of the dies to create the expansion room for the material, the material is in a so-called plasticized phase. The natural expansion or puffing up of the heated and pressurized material will take place as long as the material is in that plasticized phase and will end when the material solidifies. In order to achieve maximum product thicknesses, it is important to obtain a high opening speed of the dies in that plasticized phase thus maximizing the speed of creating the expansion room and limiting the expansion as little as possible.

AIM OF THE INVENTION

The aim of the invention is to provide a hydraulically actuated and controlled food pressure-baking apparatus or so-called puffing or popping machine having sufficient end expansion speed to make food products as could be achieved with pneumatically or air-driven machinery.

SUMMARY OF THE INVENTION

In a first aspect of the invention a hydraulic drive system for a food baking apparatus is provided, wherein the food baking apparatus comprises of dies where in between a food product, e.g. a cracker, is baked. The hydraulic drive system comprises at least three hydraulic cylinders, each comprising a double-acting piston. Further, the at least three hydraulic cylinders each comprise a position sensor, i.e. a sensor determining the position of the hydraulic cylinder, whereas the position itself has an effect on the movement of the cylinders and hence on the opening of the die spacing and herewith generated possible expansion of the food product. According to an embodiment, a so-called movable punch, i.e. lower mold or lower die, is provided in connection with the hydraulic drive system, for moving the lower mold or die closer towards or further away from the upper mold or die. In other words, in said embodiment the hydraulic drive system provides drive means for moving the punch. The hydraulic cylinders each have a respective stroke. Moreover, the hydraulic cylinders cooperate with each other and are fixedly joined to one another in line, one after the other, in an integral block assembly having a certain length. The integral block assembly has a drive shaft preferably acting directly or by means of a transmission member upon the punch for adjusting the die spacing. The system is characterized in that at least two of the at least three hydraulic cylinders of the integral block assembly are movable from their position sensor till the end of their respective stroke, thereby shortening or lengthening the length of the integral block assembly. According to an embodiment, at least two of the at least three hydraulic cylinders can generate expansion room for the dies where in between the food product is baked. According to an embodiment, at least one of the at least three hydraulic cylinders, in particular the middle of the at least three hydraulic cylinders, is provided particularly for positioning the dies where in between the food product is baked. As will be further detailed below, the opening of the dies for generating an expansion room is part of the food baking process and corresponds to a high speed opening of the dies to enable expansion of the product being prepared. Whereas the positioning of the dies corresponds merely to an upwards or downwards movement of the lower die; such positioning of the dies being considered independent of the generation of the expansion room. Referring to both embodiments, either focused on generating expansion room, or else on positioning the dies, in any of those the distance between the dies, i.e. between upper and lower die, is manipulated. More in particular, according to an embodiment, the lower die or punch is movable for adjusting the distance with the upper die.

In a second aspect of the invention a food baking apparatus is provided comprising a hydraulic drive system in accordance with the first aspect.

In a third aspect of the invention a method is provided for hydraulically controlling a food baking process. The method comprises the following steps. A first step of providing at least three double-acting hydraulic cylinder each having a respective stroke. A second step is defined by providing each of the cylinders with a respective position sensor. In a third step, the cylinders are mounted in line in an integral block assembly having a certain length. During fourth step at least two of the at least three hydraulic cylinders in the integral block assembly are moved from their respective position sensor optionally till the end of their respective stroke towards each other, thereby shortening the length of the integral block assembly.

In a fourth aspect of the invention a food baking process is provided with hydraulic control comprising the step of providing a hydraulic drive system in accordance with the first aspect, and/or the hydraulic control being based on the method in accordance with third aspect.

In a fifth aspect of the invention a cracker, chip or the like food product is provided, made by means of a food baking process in accordance with fourth aspect.

BRIEF DESCRIPTION OF THE DRAWINGS

In FIG. 2 (*a*) a hydraulic drive system comprising three cylinders is shown. In FIG. 2 (*b*) such hydraulic drive system is depicted again, but now sensors provided onto the cylinders are also indicated.

DETAILED DESCRIPTION OF THE INVENTION

As described in the background above, the speed of opening of the dies has an important influence on the baked food product. In order to increase this speed, and hence achieve higher opening speeds of the dies on a hydraulically driven food baking apparatus, several technical solutions are initially considered. One can think of for example using hydraulic pumps with higher oil flow, however this seems not an adequate solution. Picking up the signal of the position sensors on the hydraulic cylinders, for controlling movement thereof and particularly for a fixed starting position of the inward movement, becomes very inaccurate. Alternatively, higher oil pressures could be applied, however only leading to considerable pressure spikes and the opening of the overpressure valve in the hydraulic circuit.

The present invention is related to providing extra hydraulic effect or force to be exerted for increasing the speed of opening of the dies, and hence speeding up the expansion. The present invention is therefore related to the use of an additional hydraulic actuator, comprising of a double-acting hydraulic cylinder, being mounted in line with the—in accordance with the art—existing double-acting hydraulic cylinders. In the art, the existing double-acting hydraulic cylinders, more in particular of which two being used, are mounted back-to-back in a hydraulic block assembly.

According to an embodiment, the extra double-acting hydraulic cylinder is mounted in line with and as an extension of the existing double-acting hydraulic cylinders.

Figure 1:
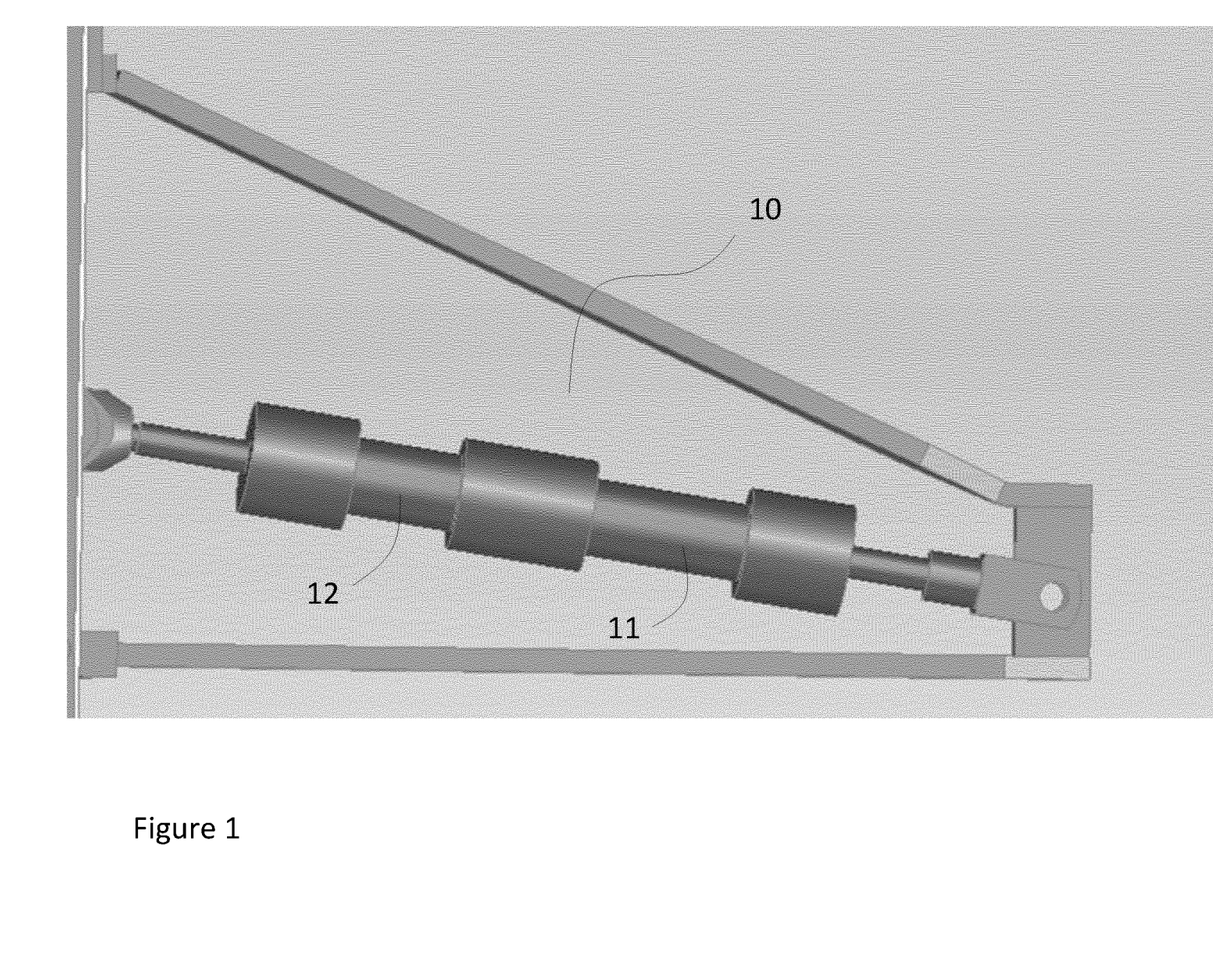
FIG. 1 illustrates hydraulic drive system of a food baking apparatus according to the art.
Figure 2:
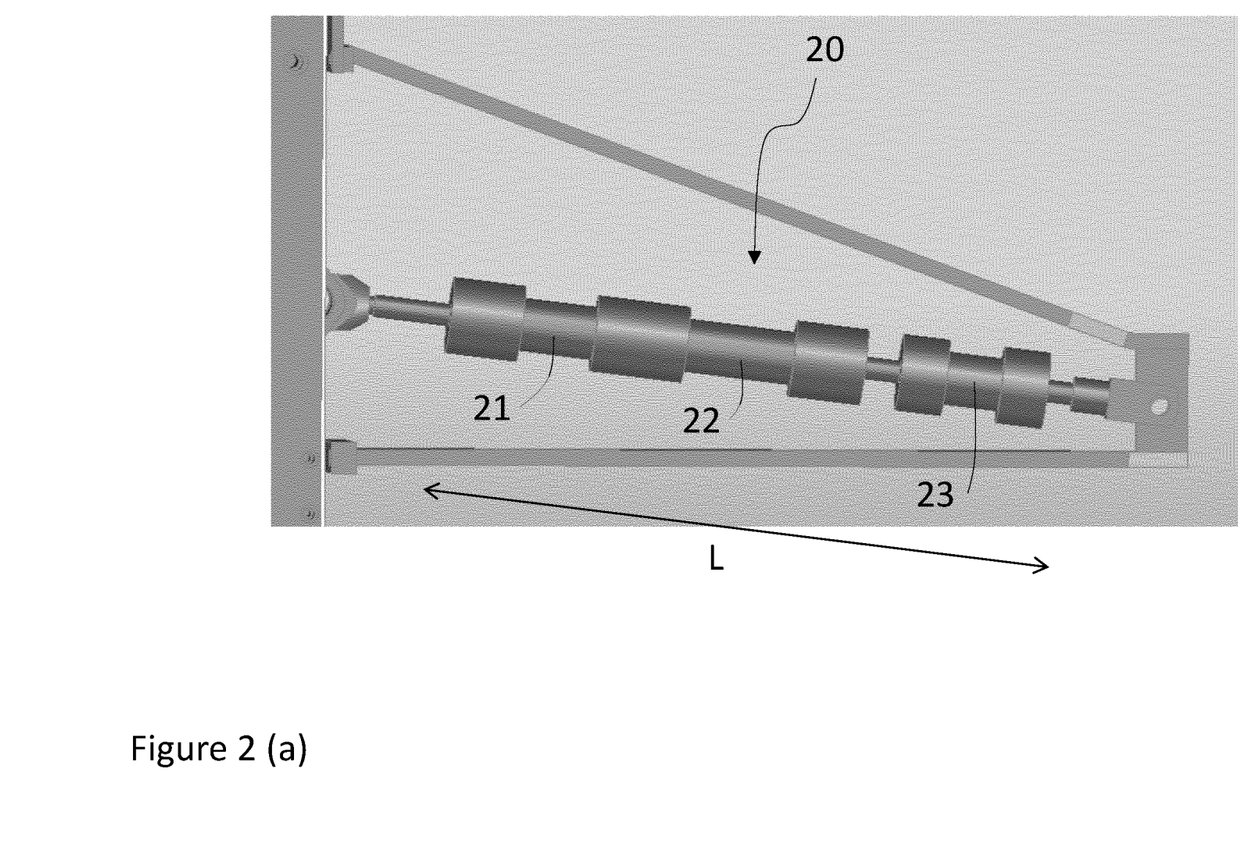
FIG. 2 illustrates an embodiment of the hydraulic drive system in accordance with the invention.

As mentioned earlier, in accordance with the art as depicted in FIG. 1, illustrating a hydraulic drive system 10 comprising of two double-acting cylinders 11, 12 mounted back-to-back, the generation of expansion room or opening of the dies is achieved by the inward movement of the cylinder 12 from the position sensor till the end of its stroke. According to an embodiment of the invention, FIG. 2 (a) illustrates a hydraulic drive system 20 comprising of three double-acting cylinders 21, 22, 23 wherein the cylinders 21, 23, also referred to as outer cylinders 21, 23, are provided at the outer ends of the in line assembly of the three cylinders and the cylinder 22, also referred to as middle cylinder 22, being provided in between thereof. The middle cylinder 22 is merely used to position the lower die in the different positions needed for e.g. dosing starchy materials, and removing the finished product or cracker, and accordingly provides the respective positioning of the dies independent of the generation of the expansion room or opening of the dies therefor. The three cylinders 21, 22, 23 are connected, while cooperating and being fixedly joined to one another in line, defining an integral block assembly having a length L. The three cylinders comprise each a position sensor, and each have a respective stroke. The generation of expansion room or opening of the dies is now achieved by a simultaneous inward movement of both outer end cylinders 21, 23 both moving inward from their respective position sensor till the end of their respective stroke, thereby shortening the length L of the integral block assembly. This is leading to an increased (e.g. doubled) opening force and thus much higher opening speed of the dies. As a result, more expansion, and hence a higher product thickness can be achieved. While achieving a higher opening speed of the dies in this way, an accurate picking up of the signal of the position sensors on both outer cylinders and particularly the fixed starting position of the inward movement of both outer cylinders, is moreover retained. This means that the food baking apparatus will produce food products with very even thickness, shape and texture, or else constant quality over time.

According to an alternative embodiment, the outer cylinders 21, 23 from FIG. 2 (a) can also be mounted back-to-back next to each other, while having the middle cylinder 22 then positioned at one of the outer ends, for example where the outer cylinder 23 is presented in FIG. 2 (a). Although having the individual cylinders positioned in another sequence, the hydraulic effect of the alternative design, generating either expansion, either being responsible for the positioning of the dies, will be the same as compared to the architecture of FIG. 2 (a). In other words, as long as one of the three cylinders is provided for the positioning, and two cylinders are provided for the expansion, a similar hydraulic effect resulting in higher opening speed of the dies, and hence more airy and thicker crackers after baking, will be achieved.

The use and impact of the sensors provided onto the cylinders is now further explained. FIG. 2 (b) illustrates the hydraulic drive system 20 comprising of three double-acting cylinders 21, 22, 23 as shown in FIG. 2 (a) but moreover indicating the sensors 1, 2, 3, 4, 5, 6 being provided in pair onto the cylinders 21, 22, 23 respectively. Each cylinder comprises two sensors: for cylinder 21 the sensors 1, 2 are foreseen, cylinder 22 is provided with the sensors 3, 4 and onto cylinder 23 the sensors 5, 6 are mounted. The outer cylinders 21, 23 can simultaneously move and open, and herewith achieve faster movement, i.e. opening or closing, of the dies where in between food is baked. The outer cylinder 21 moves from sensor 1 in the direction of sensor 2, whereas the outer cylinder 23 moves from sensor 6 towards sensor 5 during inward movement. The entire or total stroke (length) being accomplished by both cylinders is thus the combination of the two stroke lengths respectively from sensor 1 to sensor 2, and from sensor 6 to sensor 5 respectively. It is noted that only the sensors 1, 6—also called position sensors—can be adjusted in position in order to achieve the total stroke length. The sensors 2, 5 are always positioned at the end point of their respective cylinder inward stroke. In fact, at this inward stroke of these respective cylinders 21, 23, i.e. the moment when food in between the dies is expanded, it is fairly impossible to have the cylinders terminated in a reliable and repetitive way elsewhere than at the end of their stroke length, determining the mechanical (or physical) end anyhow.

For a particular adjustment of the sensors 1, 6 of the respective cylinders 21, 23, the food baking apparatus operates with regular behavior delivering a constant quality end product e.g. cracker. In other words, a constant thickness can be achieved, and hence not producing a mix randomly with much thinner and much thicker crackers.

This means that, actually, the sensors 2, 5 are not particularly needed for adjustment and positioning, but are only used here for feedback notification to the PLC, indicating for example that the cylinders are at the end of their inward movement. If not, alternatively, the cylinders can be put in this end position at the start or beginning of operating the machine.

The sensors 3, 4 from cylinder 22 also do not intervene in realizing the expansion stroke of the machine, i.e. food baking apparatus. Instead, the cylinder 22 and corresponding sensors 3, 4 are responsible for the positioning of the dies, e.g. at ejection of crackers or when new raw material is brought into the machine to be baked.

According to a further embodiment, more than three cylinders are provided and are positioned in a random sequence, for generating either expansion as well as providing positioning of the dies. In accordance with the invention, amongst the at least three or more than three cylinders, at least one cylinder is provided for the positioning, whereas the two or more other cylinders are intended for generating expansion.

Figure 3:
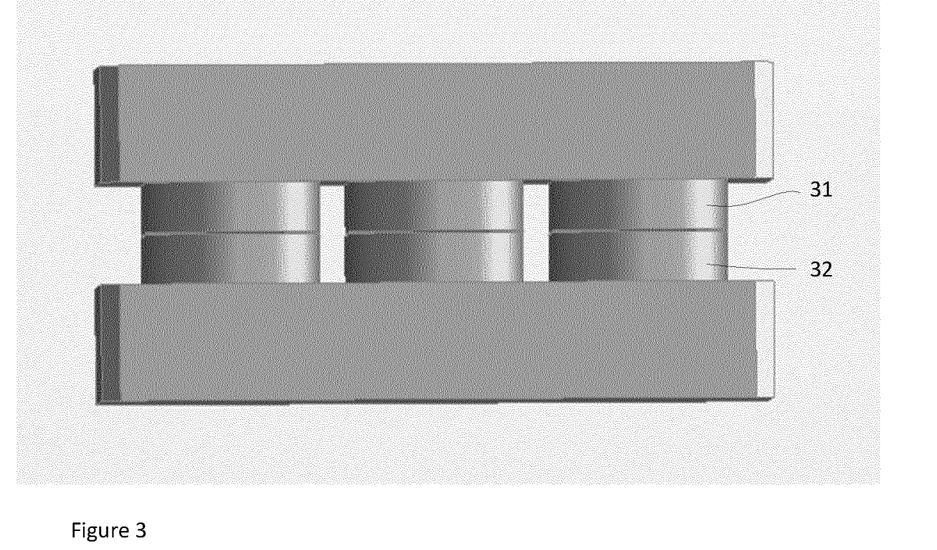
FIG. 3 illustrates an embodiment of the dies in closed position in accordance with the invention.
Figure 4:
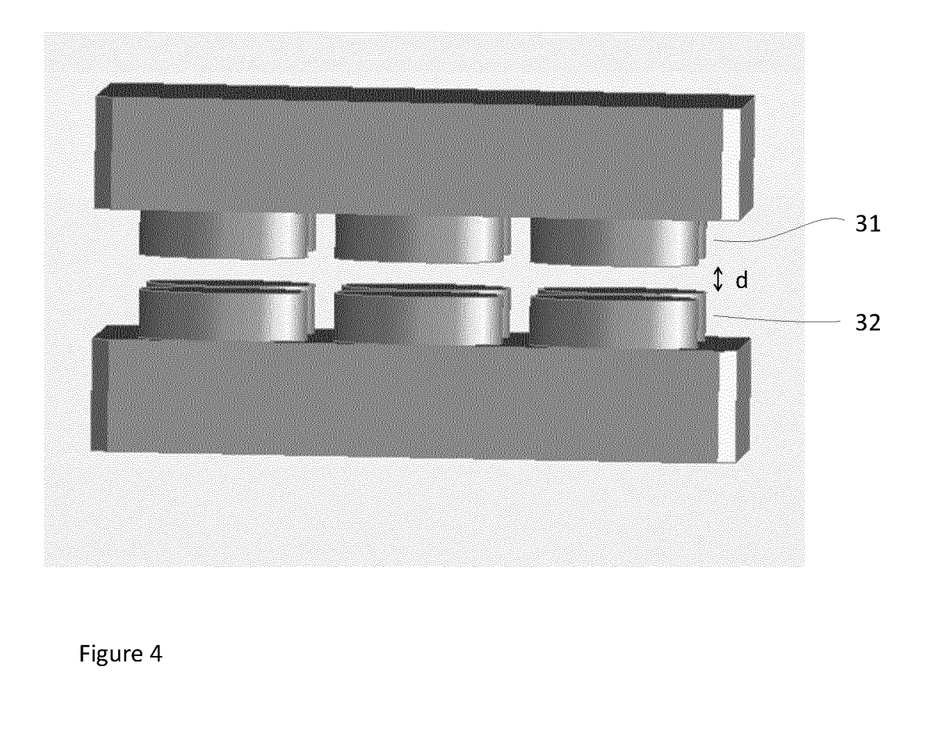
FIG. 4 illustrates an embodiment of the dies in open position in accordance with the invention.

Depicted in FIGS. 3 and 4 are the dies 31, 32 either in closed or in open position respectively, for which the time needed for moving from one position (e.g. closed as illustrated in FIG. 3) to the other (e.g. open as illustrated in FIG. 4), or vice versa, is significantly less as compared to the art. For FIG. 4, where the dies 31, 32 are shown in open position, a distance d between the upper dies 31 and lower dies 32 is indicated. Moreover, the speed using hydraulics, for moving positions of the dies including the ability and/or flexibility in expansion of grain or cereal material there in between, is comparable with pneumatic system's high speed, in accordance with the invention.

Figure 5:
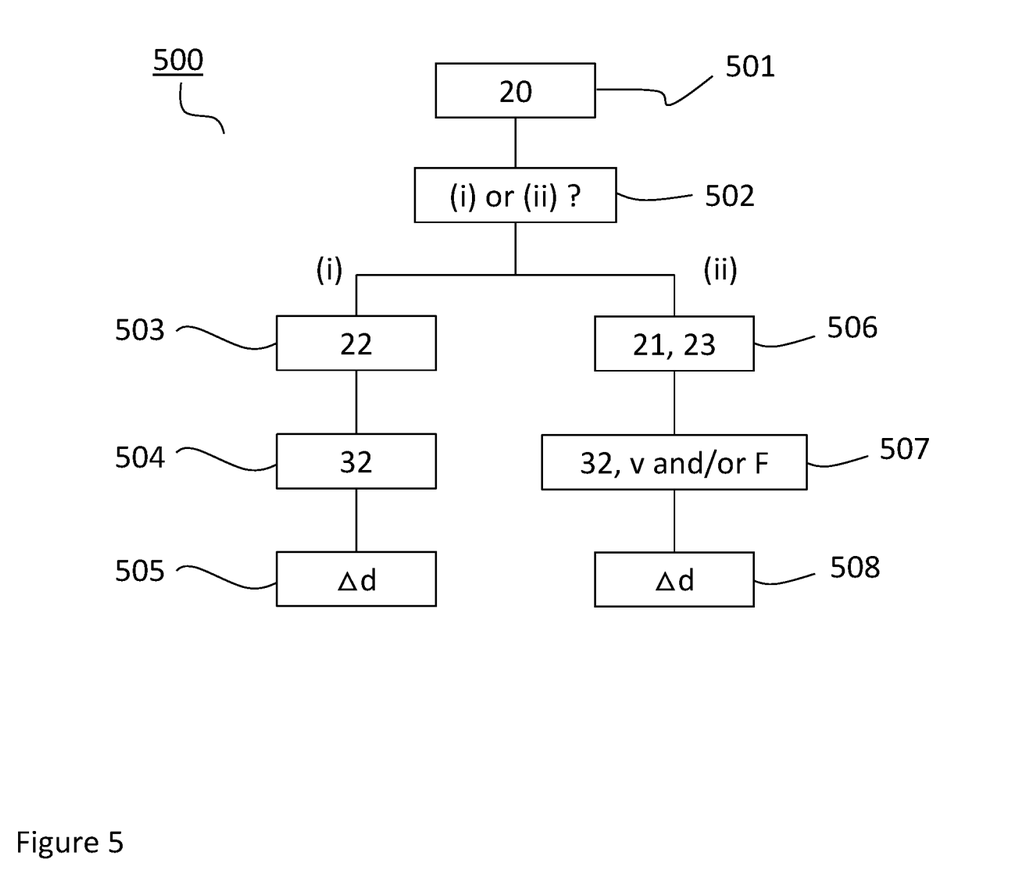
FIG. 5 illustrates a flow-chart embodiment of the hydraulic drive system operation in accordance with the invention.

Referring now to FIG. 5 wherein a flow-chart embodiment of the hydraulic drive system operation 500 in accordance with the invention being illustrated, in particular the cylinders operation causing an effect on the position of the lower die 32, and hence on the distance d between the dies 31, 32. At the same time is here referred to the embodiment of FIG. 2 for the installation of the hydraulic drive system 20 and its cylinder 21, 22, 23, wherein the middle cylinder 22 is merely meant for positioning of the lower die 32, whereas cylinders 21, 23 are intended for generating expansion room, or compression between the dies 31, 32. The hydraulic drive system operation 500 with focus on the cylinders operation, is now described starting with block 501, for initiating the operation, i.e. turning on the hydraulic drive system 20 with manifold block of cylinders 21, 22, 23, being connected with the movable punch, or lower die 32. Block 502 represents questioning whether (i) the position of the lower die 32 needs to be adapted or fine-tuned for bringing in starchy material, or taking out the (finished) cracker, or else (ii) if compression or expansion is required for the material to be baked being provided between the dies. In case of (i) merely for positioning the lower die 32 because material has to be placed in between or removed from the dies 31, 32, block 503 is to be continued with, for moving the cylinder 22 either inwardly or outwards. As a result, as indicated by block 504, the lower die 32 being connected with the cylinders manifold, will move up or down. There is no particular force or speed or any other parameter involved or needed for performing this positioning of the lower die 32 with cylinder 22. Block 505 represents that the distance d between the dies 31, 32 thus being changed. Following now the right part of the flow chart of FIG. 5, i.e. in case of (ii) expansion or compression for the material to be baked being selected during the baking process, block 506 is to be continued with, for moving both cylinders 21, 23 simultaneously inwardly or outwards. However, this is not done in an arbitrary manner, but performed such that moving up or down of the lower die 32, is done at a particular speed v (e.g. for expansion) and/or with a particular force F (e.g. for compression), as represented by block 507. The distance d between the dies 31, 32 again being changed, being represented now by block 508.

According to an embodiment of the invention, the hydraulic cylinder unit design of a standard rice cake machine, such as the Incomec Cerex Processor, is altered to be made up of three hydraulic cylinders instead of two hydraulic cylinders in order to allow for a higher end expansion speed in a repeatable and controllable way. The third cylinder is specifically designed for this purpose. The hydraulic manifold block designed to control three hydraulic cylinders, allows for a hydraulic control operation, resulting in a higher end expansion speed in a repeatable and controllable way as mentioned above.

The invention claimed is:

1. A food baking apparatus comprising:
a hydraulic drive system comprising at least three hydraulic cylinders; and
two dies at an adjustable distance (d) from each other, the two dies being configured for a food product to be baked between the two dies, the two dies being operable to be opened or closed by adjustment of the adjustable distance (d) by the hydraulic drive system, wherein:
each of the at least three hydraulic cylinders comprises a double-acting piston and a position sensor;
each of the at least three hydraulic cylinders has a respective stroke; and
the at least three hydraulic cylinders cooperate with one another and are fixedly joined to one another in line in an integral block assembly determined by a length L;
one of the at least three hydraulic cylinders in the integral block assembly is provided to adjust the adjustable distance (d) of the dies for opening or closing the dies; and
the other two of the at least three hydraulic cylinders in the integral block assembly are simultaneously movable from the position sensor till the end of the respective stroke toward each other, thereby shortening the length L of the integral block assembly and generating expansion room in between the dies while increasing the adjustable distance (d).

2. A food baking process with hydraulic control, the food baking process comprising:
providing a food product between the two dies of a food baking apparatus according to claim 1; and
baking the food product with the food baking apparatus.

3. The food baking process of claim 2, wherein baking the food product comprises:
moving one of the at least three hydraulic cylinders in the integral block assembly to adjust the adjustable distance (d), thereby opening or closing the dies; and
simultaneously moving the other two of the at least three hydraulic cylinders in the integral block assembly from the respective position sensor optionally till the end of the respective stroke towards each other, thereby shortening the length L of the integral block assembly and generating expansion room in between the dies while increasing the adjustable distance (d).

4. A method for hydraulically controlling a food baking apparatus comprising two dies at an adjustable distance (d) from each other, the two dies being configured for food to be baked between the two dies, the two dies being operable to be opened or closed by adjustment of the adjustable distance (d) by a hydraulic drive system, the method comprising:
providing the hydraulic drive system with at least three double-acting hydraulic cylinders each having a respective stroke;
providing each of the at least three double-acting hydraulic cylinders with a respective position sensor;
mounting the at least three double-acting hydraulic cylinders in line in an integral block assembly having a length L;
moving one of the at least three double-acting hydraulic cylinders in the integral block assembly to adjust the adjustable distance (d), thereby opening or closing the dies; and
simultaneously moving the other two of the at least three hydraulic cylinders in the integral block assembly from the respective position sensor optionally till the end of the respective stroke towards each other, thereby shortening the length L of the integral block assembly and generating expansion room in between the dies while increasing the adjustable distance (d).

* * * * *